United States Patent
Aerts et al.

(10) Patent No.: US 9,198,354 B2
(45) Date of Patent: Dec. 1, 2015

(54) SYSTEM AND METHOD FOR PROTECTING A COTTON MODULE DURING THE UNLOADING PROCESS

(75) Inventors: Chad D. Aerts, Ephrata, PA (US); Imants Ekis, Leola, PA (US); John H. Posselius, Ephrata, PA (US); Jesse H. Orsborn, Warsaw, MO (US)

(73) Assignee: CNH Industrial America LLC, New Holland, PA (US)

(*) Notice: Subject to any disclaimer, the term of this patent is extended or adjusted under 35 U.S.C. 154(b) by 1228 days.

(21) Appl. No.: 13/004,486

(22) Filed: Jan. 11, 2011

(65) Prior Publication Data

US 2012/0177834 A1    Jul. 12, 2012

(51) Int. Cl.
*B05C 5/00* (2006.01)
*B05C 13/02* (2006.01)
*A01D 46/08* (2006.01)

(52) U.S. Cl.
CPC .............. *A01D 46/088* (2013.01); *A01D 46/08* (2013.01)

(58) Field of Classification Search
CPC ..... A01D 46/00; A01D 46/08; A01D 46/084; A01D 46/085
USPC ......... 19/66 CC; 427/424; 118/300, 500, 677
See application file for complete search history.

(56) References Cited

U.S. PATENT DOCUMENTS

| 130,616 | A | 8/1872 | Babcock |
| 2,689,642 | A | 9/1954 | Franke |
| 3,330,088 | A | 7/1967 | Dunlea, Jr. |
| 3,765,147 | A | 10/1973 | Ippolito et al. |
| 3,818,955 | A | 6/1974 | Kline |
| 3,968,625 | A | 7/1976 | Lindenmaier et al. |
| 4,057,010 | A | 11/1977 | Smith |
| 5,361,561 | A | 11/1994 | Porter |
| 6,444,273 | B2 * | 9/2002 | Coulibaly et al. ............ 427/477 |
| 2003/0056469 | A1 | 3/2003 | Armbruster |

FOREIGN PATENT DOCUMENTS

WO    03/053160 A1    7/2003

* cited by examiner

*Primary Examiner* — Alexander Weddle
(74) *Attorney, Agent, or Firm* — Rebecca L. Henkel (57) ABSTRACT

A system and method for applying a protective layer to a cotton module of compacted cotton moving in an unloading direction from a cotton module builder through an open end thereof along an unloading surface, the system including application apparatus having at least one applicator in fluid communication with at least one tank for applying a fluid contained in the at least one tank to at least a top surface of the cotton module, the fluid being applied to an exterior of the cotton module in a fluid state and solidifying into a water resistant layer prior to significantly permeating the exterior of the module, so as to capable of being removed therefrom prior to processing of the module.

12 Claims, 14 Drawing Sheets

SYSTEM AND METHOD FOR PROTECTING A COTTON MODULE DURING THE UNLOADING PROCESS

TECHNICAL FIELD

This invention relates generally to a cotton harvesting machine having an on-board cotton module builder, and more specifically to a system and method for applying a water resistant protective layer to a cotton module as it is unloaded from the module builder, such protective layer being capable of being removed prior to processing the module.

BACKGROUND ART

Cotton harvesters commonly include on-board cotton module builders having a compacting chamber in which harvested cotton is collected and compacted by compacting apparatus into a unitary mass or module which conforms to specific dimensions to facilitate handling and transporting on dedicated vehicles, and processing by gins. Such compacted cotton modules are desirably sufficiently compacted so as to retain their compacted shape without significant expansion when unloaded from the module builder. The most accepted and recognized of the known on-board module builders utilize an accompanying unloading door or ramp, which unfolds as the module builder is tilted, for providing a continuous, level unloading surface extending from the floor of the module builder to the ground or other surface onto which the module is to be unloaded. The ramp has a length which is selected so as to be at a sufficiently small angle to the ground or other surface such that the cohesion and integrity of the module are maintained, during the transition of the module from the ramp onto the surface.

Once unloaded, the module is susceptible to damage from the elements, specifically moisture from precipitation or condensation. If water penetrates the module, it can cause degradation in the quality of the processed cotton. Other problems can include an increased moisture content, the growth of mildew, mold, and other fungi, or the like. In addition, if the moisture content of the cotton is too high, a cotton gin may have difficulty processing the cotton efficiently.

To reduce the likelihood of problems due to moisture, cotton module covers are often manually applied over the top of the cotton modules. A typical cover consists of a water proof or water resistant cap-like member having a substantially rectangular top, side walls extending downward from each side of the top, and end walls extending downward from each end of the top. The covers must be secured to remain on the module during high winds and storms. Typically, the modules are secured with ropes, cords, horizontal straps, spikes, weights, and the like.

Applying and securing cotton modules covers is a labor intensive practice that must be performed as soon as possible after harvesting, often by a dedicated crew. If crew is unavailable to cover the modules, or if the covers are damaged by wind or water, the quality and/or quantity of harvested cotton is negatively impacted.

Accordingly, what is sought is a system and method for applying a water resistant protective layer to a cotton module as it is unloaded from the cotton module builder which overcomes at least one of the problems, shortcomings or disadvantages set forth above.

SUMMARY OF THE INVENTION

What is disclosed is a system and method for applying a water resistant protective layer to a cotton module as it is unloaded from the cotton module builder which overcomes at least one of the problems, shortcomings or disadvantages set forth above.

According to a preferred embodiment of the invention, a system and method for protecting a cotton module of compacted cotton is disclosed. The module is protected as it is moving in an unloading direction from a cotton compacting chamber of a cotton module builder through an open end thereof. The module moves along an unloading surface including at least one selectably operable unloading cotton driver in position for receiving and moving the cotton module. The system of the present invention preferably includes application apparatus including at least one applicator in fluid communication with at least one tank. The at least one applicator is configured and operable to apply a fluid contained in the at least one tank to at least a top surface of the cotton module as the cotton module moves through the open end of the cotton module builder along the unloading surface. The fluid is configured to be applied to an exterior of the cotton module in a fluid state and solidify into a water resistant layer prior to significantly permeating the exterior of the module, so as to capable of being removed therefrom prior to processing of the module. As used herein, the term apply refers to a variety of application methods, including, but not limited to, spray, foam, drip, liquid curtain, brush, and the like.

According to a preferred aspect of the invention, the application apparatus is further configured and operable to apply the fluid to side surfaces adjacent to the top surface of the cotton module.

Many cotton harvesters employ an unloader control system configured and operable to selectably operate the at least one unloading cotton driver based on location of a trailing end of the cotton module along the unloading surface. According to a preferred feature of the invention, the application apparatus is configured and operable to begin and cease application of the fluid as a function of operation of the at least one unloading driver by the unloader control system.

According to a another preferred feature of the invention, the application apparatus is configured and operable to begin applying the fluid as the at least one unloading cotton driver initiates movement of the cotton module in the unloading direction and to cease applying the fluid after at least one unloading cotton driver ceases operation.

In addition, many cotton harvesters utilize sensors or other apparatus for detecting passage of a trailing end of the cotton module by at least on predetermined location on the unloading surface. According to yet another preferred feature of the invention, the application apparatus is configured and operable to begin applying the fluid as the at least one unloading cotton driver initiates movement of the cotton module in the unloading direction and cease application of the fluid as a function of passage of the trailing end of the cotton module beyond the at least one predetermined location.

According to a preferred aspect of the invention, the at least one applicator comprises at least one nozzle configured and operable to apply the fluid in a fan shaped pattern.

According to another preferred embodiment of the invention the at least one applicator is pivotable from an initial position facing the open end of the module builder through a range of positions to a final position facing the unloading direction. The application apparatus is configured and operable to automatically begin applying the fluid with the at least one applicator in the initial position, pivot the at least one applicator through the range of positions as the cotton module moves along the unloading surface, and cease applying fluid after the at least one applicator reaches the final position, such that the at least one applicator is pivoted to apply the fluid to a leading end of the cotton module as the cotton module exits the module builder, to the top side of the module as the module moves along the unloading surface and to the trailing end after the module passes the at least one applicator.

According to a preferred feature of the invention, the at least one applicator includes a check valve to prevent application of the fluid to the unloading surface.

According to another preferred aspect of the invention, the fluid comprises foam.

According to yet another preferred aspect of the invention, the fluid comprises a mixture of two or more chemicals contained in two or more tanks, respectively.

According to another preferred feature of the invention, the fluid solidifies in a manner to prevent significant expansion of the cotton module.

Advantages of the present invention include, but are not limited to, protection of the cotton module from moisture and wind without requiring a dedicated crew to apply the module covering.

DETAILED DESCRIPTION OF THE INVENTION

Figure 1:
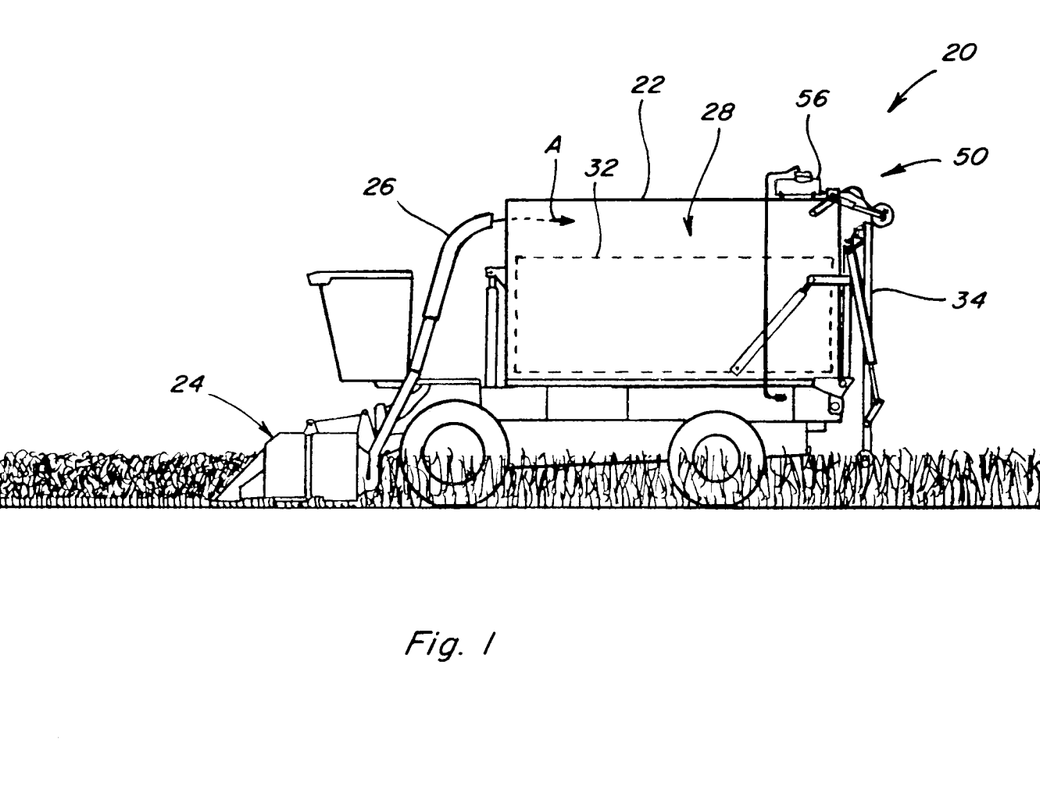
FIG. 1 is a simplified side view of a cotton module builder, shown in a horizontal operational position including a cotton module protection system of the present invention, supported on a self-propelled cotton harvester.

Turning now to the drawings, FIG. 1 depicts a cotton harvester 20 including an on-board cotton module builder 22 in a horizontal operational position. Generally, harvester 20 includes a plurality of individual harvesting row units 24 supported on a front end thereof and operable for removing cotton from cotton plants, as harvester 20 is moved forwardly through a cotton field. The harvested cotton is propelled by flows of air upwardly and rearwardly from row units 24 through a side-by-side array of ducts 26 extending upwardly and rearwardly from units 24 into cotton module builder 22, as denoted by arrow A. Cotton module builder 22 includes an interior cotton compacting chamber 28 for receiving and compacting the harvested cotton into a unitary cotton module 32, shown in phantom, therein.

Figure 2:
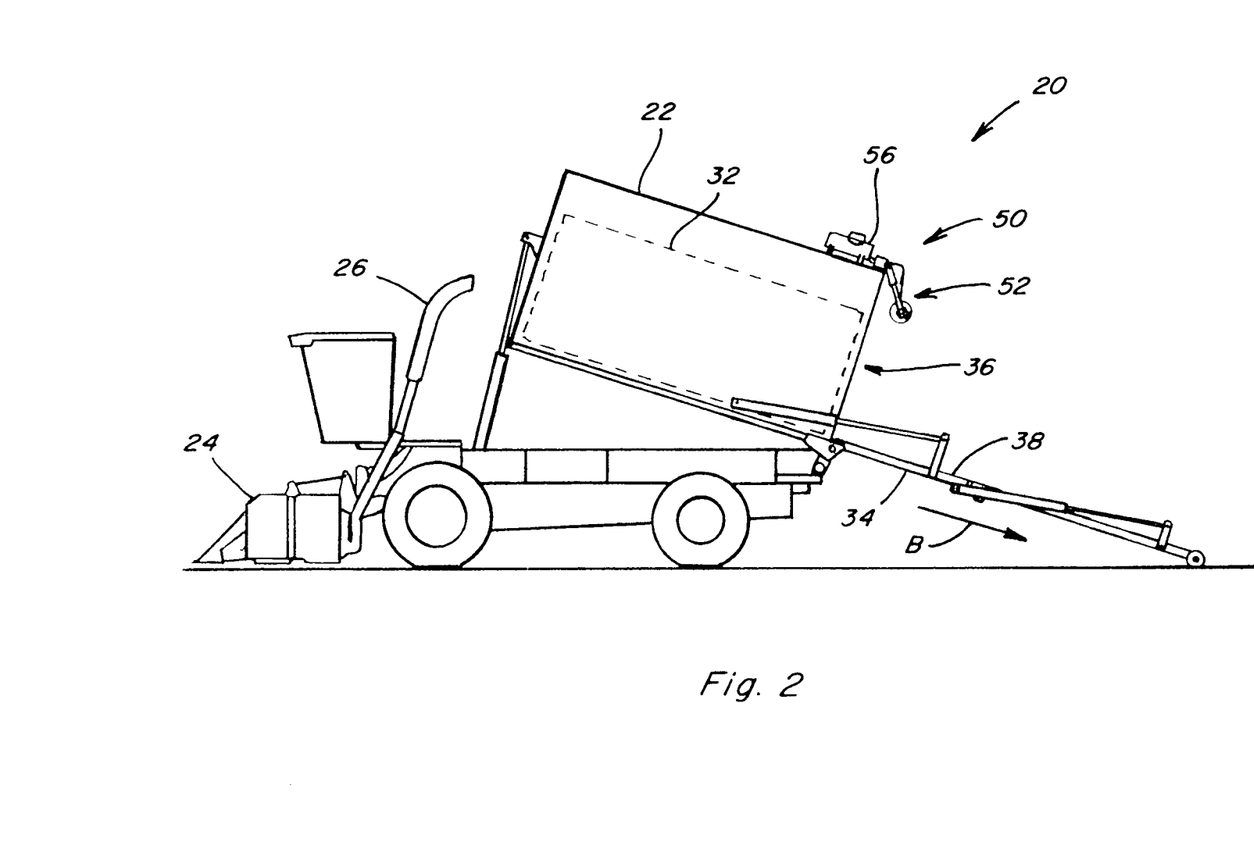
FIG. 2 is a simplified side view of the module builder, shown in a tilted unloading position with the unloading door in a fully unfolded open or unloading position.
Figure 3:
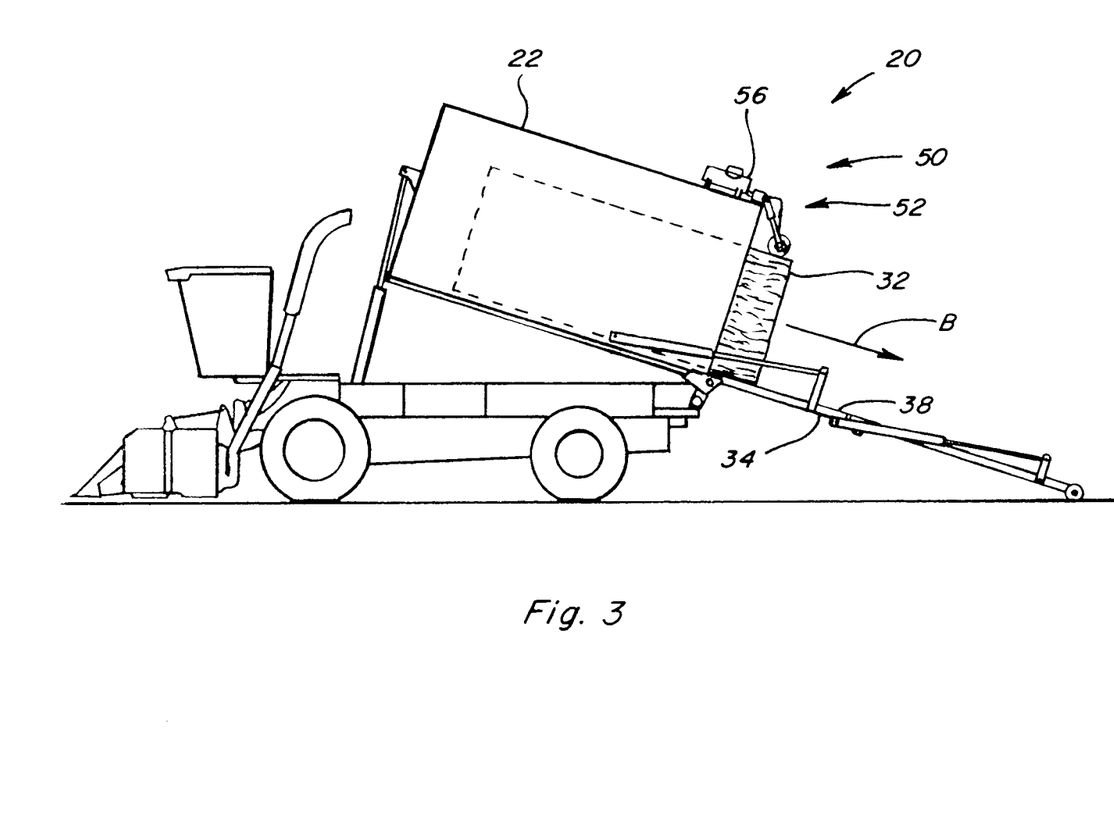
FIG. 3 is a simplified rear view of the cotton module builder including an application apparatus of the system.

With reference also to FIGS. 2 and 3, cotton module builder 22 includes a folding door arrangement 34 controllably operable between a closed position (FIG. 1) in closing relation to a rear open end 36 of module builder 22, and an unfolded or unloading position having an unloading surface 38 (FIGS. 2 and 3) for unloading module 32 in concert with tilting of module builder 22. Unloading surface 38 includes at least one selectably operable unloading cotton driver, depicted in FIG. 4 by drag chains 40 operable by rotation of a shaft 43 by a hydraulic motor 42, in position for receiving and moving cotton module 32 in an unloading direction, denoted by arrow B.

Figure 4:
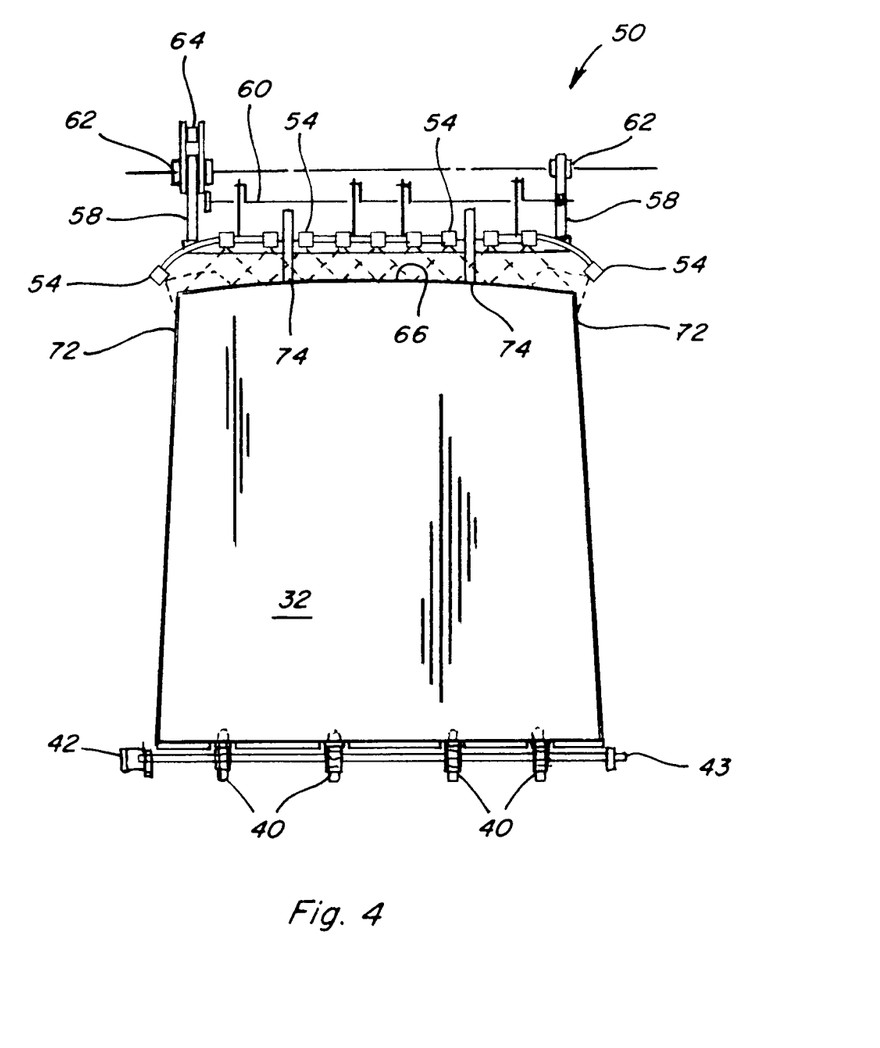
FIG. 4 is a simplified side view of the module builder unloading a compacted cotton module and applying a protective layer thereon.
Figure 5:
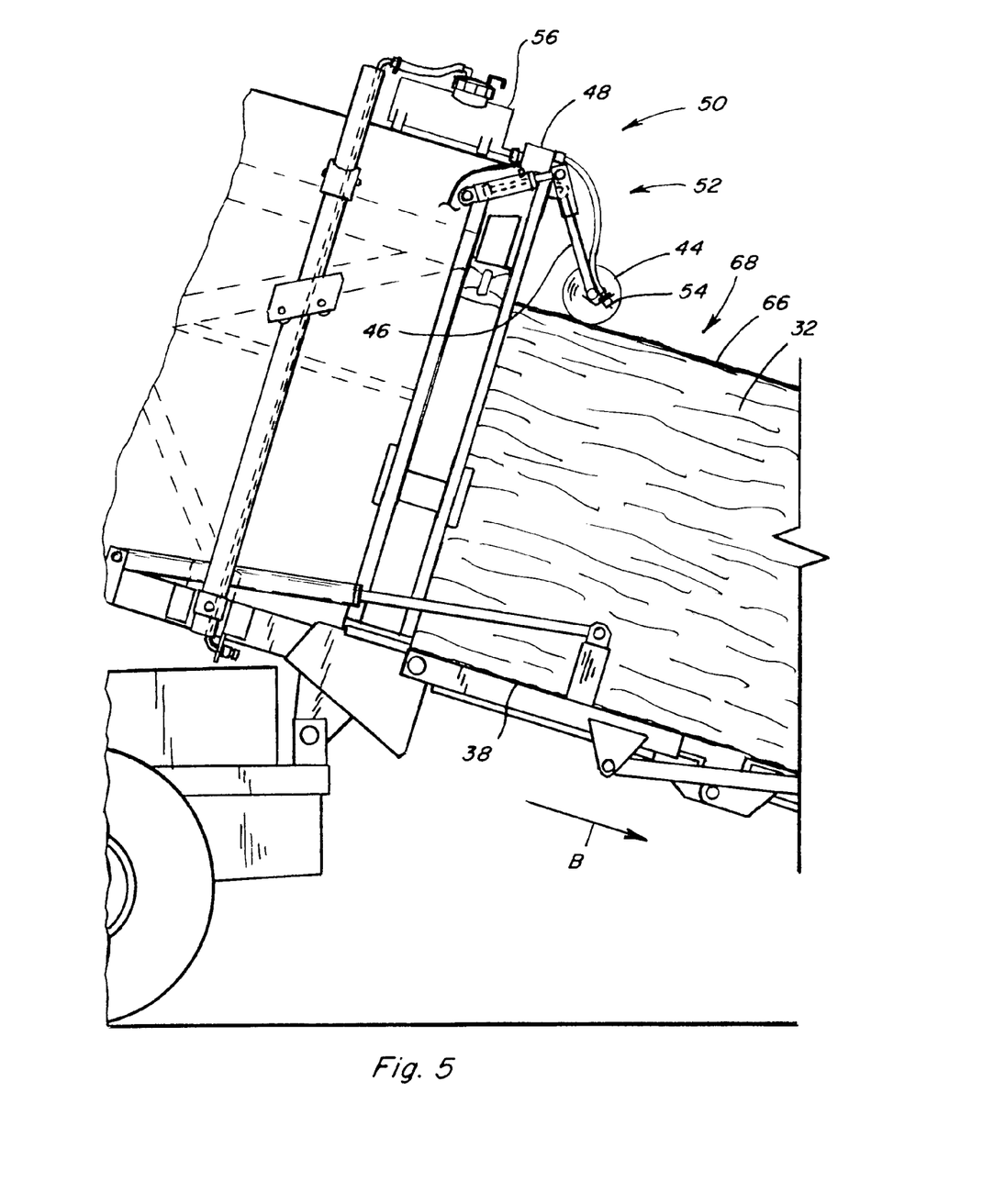
FIG. 5 is an enlarged partial view of the cotton module and the applicator apparatus.
Figure 6:
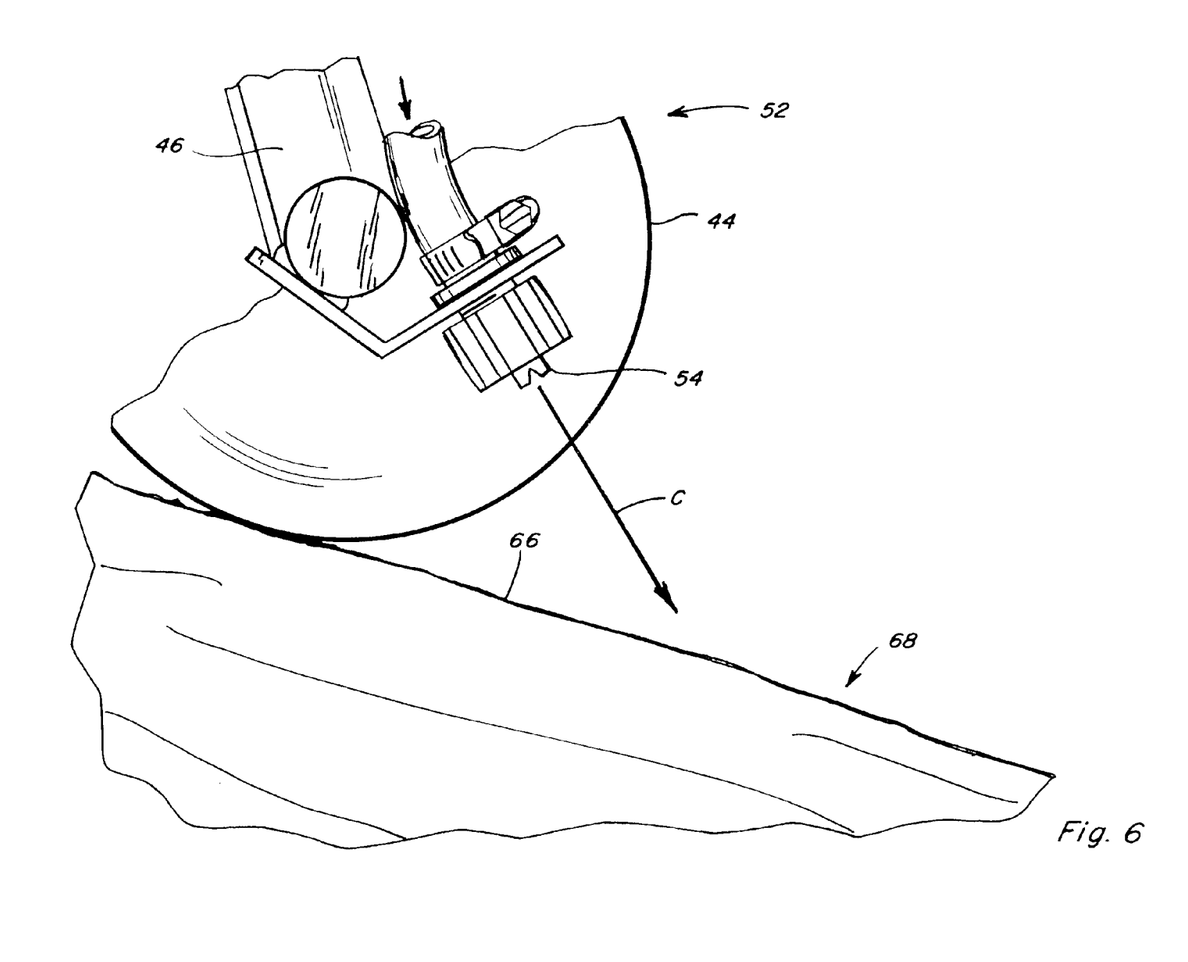
FIG. 6 is an enlarged simplified view of a portion of the applicator apparatus.

Harvester 20 includes a system 50 constructed and operable according to the method of the present invention for protecting cotton modules, such as module 32, moving in unloading direction B from cotton compacting chamber 28 through open end 36 of cotton module builder 22. As can be most easily seen in FIG. 5, system 50 preferably comprises application apparatus 52 including at least one applicator 54 in fluid communication with at least one tank 56. Application apparatus 52 is preferably positionable in a lower stowed position (FIG. 1) and an operational position (FIGS. 2-4). FIGS. 4-6 show a representative, non-limiting application apparatus for selectably positioning applicators 54 including rods 58 and a linkage 60 pivotable about an axis 62 by extension and retraction of a ram 64 of a hydraulic cylinder. In addition, the at least one applicator 54 may be supported by support arm 46 and guided along top surface 66 of cotton module 32 by at least one disk 44 in close proximity to top surface 66 of module 32.

Figure 7:
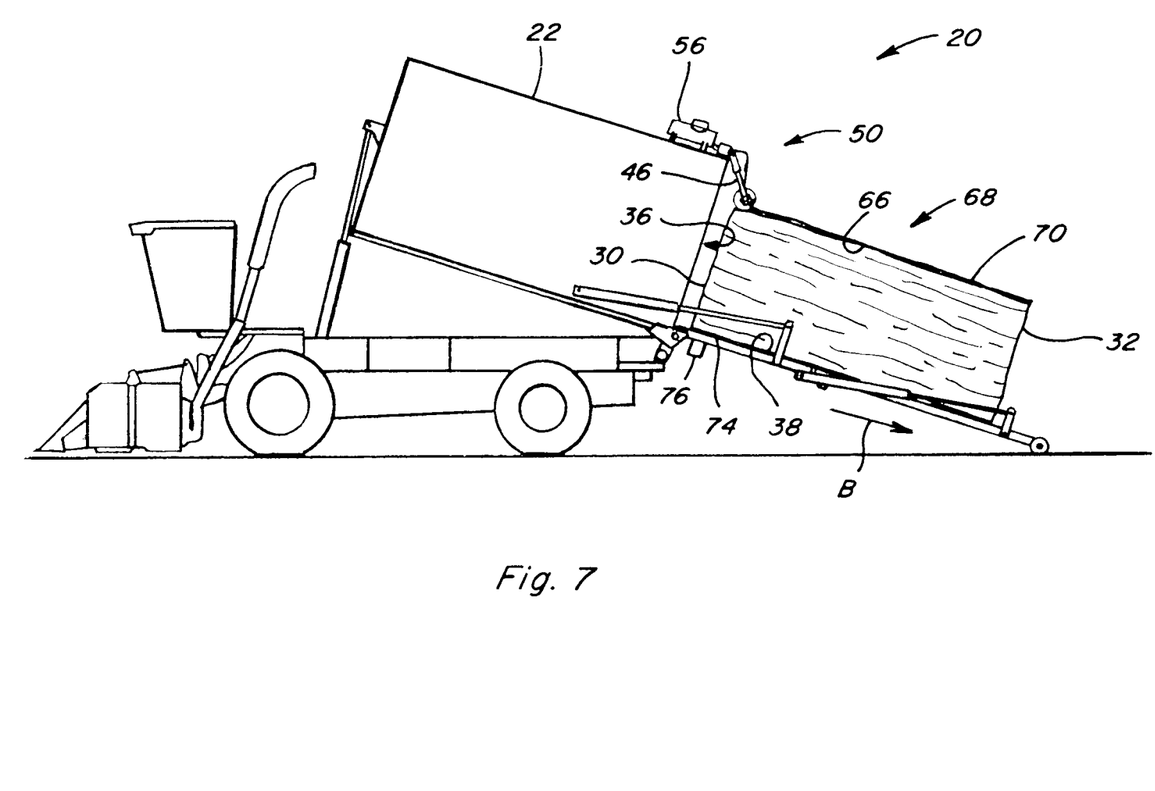
FIG. 7 is another simplified side view of the module builder unloading a compacted cotton module and applying a protective layer thereon.

Referring now to FIGS. 5-7, the at least one applicator 54 is configured and operable to apply a fluid denoted by arrow C contained in the at least one tank 56 to at least a top surface 66 of cotton module 32 as cotton module 32 moves through open end 36 of cotton module builder 22 along unloading surface 38. Fluid C is configured to be applied to an exterior 68 of cotton module 32 in a fluid state and solidify into a water resistant or protective layer 70 prior to significantly permeating exterior 68 of module 32, so as to capable of being removed therefrom prior to processing of module 32 as shown in FIGS. 12-15. As used herein, the term apply refers to a variety of application methods, including, but not limited to, spray, foam, drip, liquid curtain, brush, and the like.

According to a preferred aspect of system 50 application apparatus 52 is further configured and operable to apply fluid C to side surfaces 72 adjacent to top surface 66 of cotton module 32 as seen in FIG. 4. When applied in this manner, protective layer 70 provides the advantages of traditional module covers, such as protection from moisture, minimizing expansion, and the like, without requiring a dedicated crew to cover module 32.

To reduce losses of loose cotton during unloading, and to increase efficiency, many cotton harvesters include an unloader control system configured and operable to selectably operate the at least one unloading cotton driver based on location of a trailing end 30 of cotton module 32 along unloading surface 38. As a preferred feature of the invention, application apparatus 52 is configured and operable to begin and cease application of fluid C as a function of operation of the at least one unloading driver by the unloader control system.

According to another preferred feature of the invention, application apparatus 52 is configured and operable to begin applying fluid C as the at least one unloading cotton driver initiates movement of cotton module 32 in unloading direction B and to cease applying fluid C after at least one unloading cotton driver ceases operation.

Many cotton harvesters include apparatus, such as sensor 76 as depicted in FIG. 7, for detecting passage of trailing end 30 of cotton module 32 by at least one predetermined location, for example location 74, along unloading surface 38. According to yet another preferred feature of the invention, application apparatus 52 is configured and operable to begin applying fluid C as the at least one unloading cotton driver, such as drag chains 40, initiates movement of cotton module 32 in unloading direction B and cease application of the fluid as a function of passage of trailing end 30 of cotton module 32 beyond the at least one predetermined location 74.

According to yet another preferred feature of the invention, application apparatus 52 is configured and operable to begin applying fluid C as the at least one unloading cotton driver initiates movement of cotton module 32 in unloading direction B, and to cease applying fluid C as trailing end 30 of cotton module 32 passes the at least one predetermined location 74 along unloading surface 38.

With reference now to FIG. 6, the at least one applicator 54 comprises at least one nozzle according to a preferred aspect of the invention. In addition, the nozzle is configured and operable to apply the fluid in a fan shaped pattern as shown by the dotted lines in FIG. 4.

Figure 8:
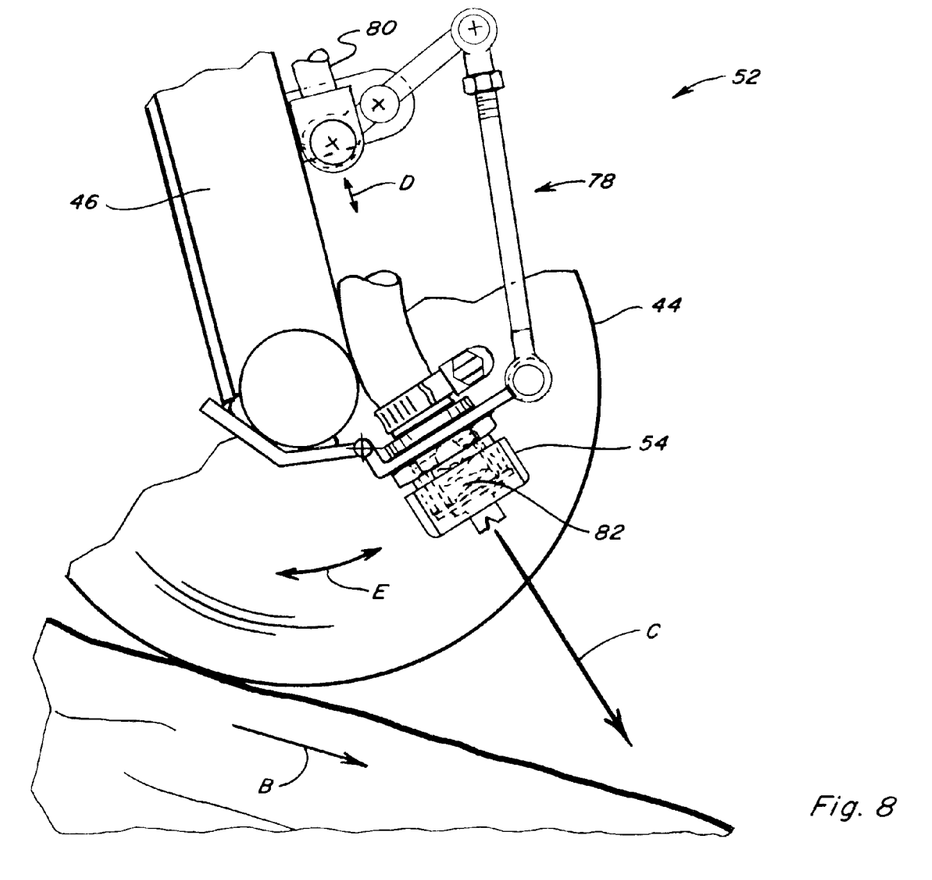
FIG. 8 is simplified enlarged side view of a preferred feature of the application apparatus of the system.
Figure 9:
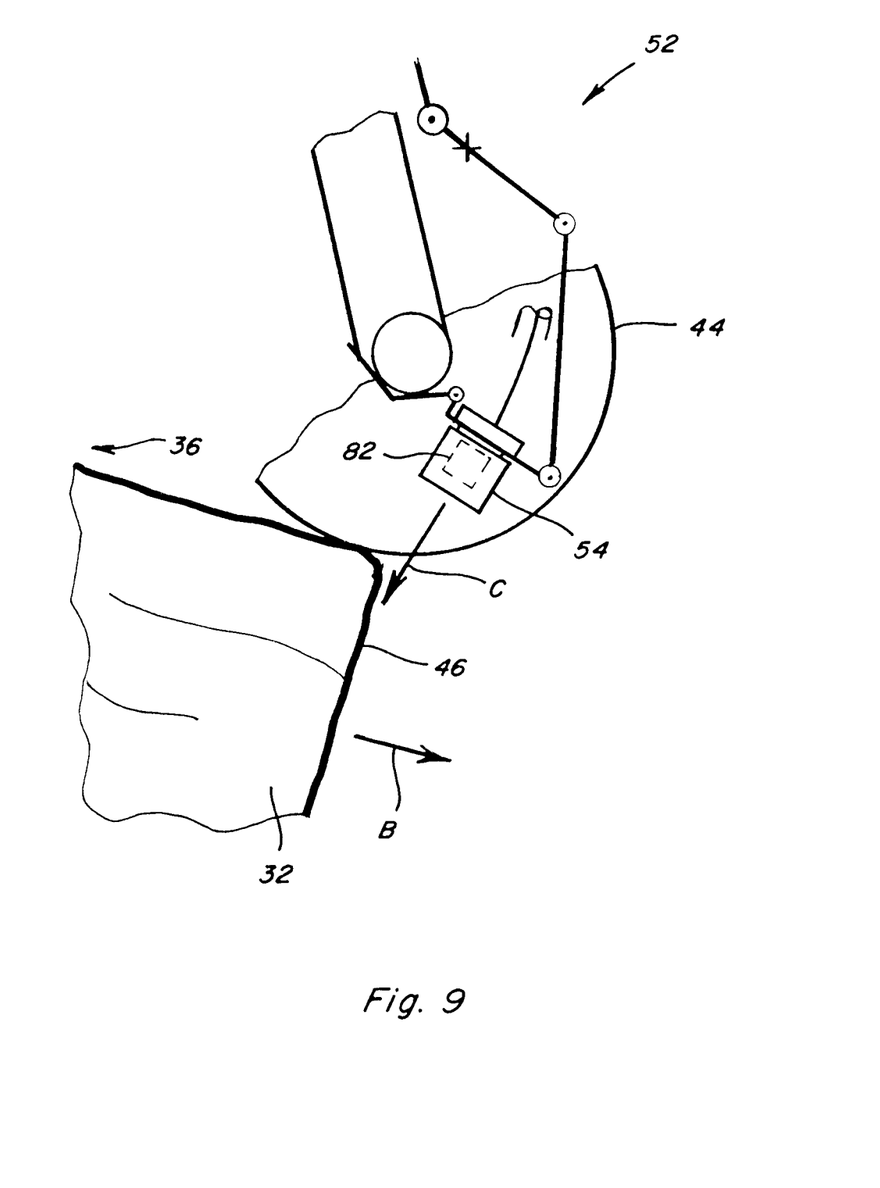
FIG. 9 is another simplified enlarged side view of the preferred feature of the application apparatus of the system.
Figure 10:
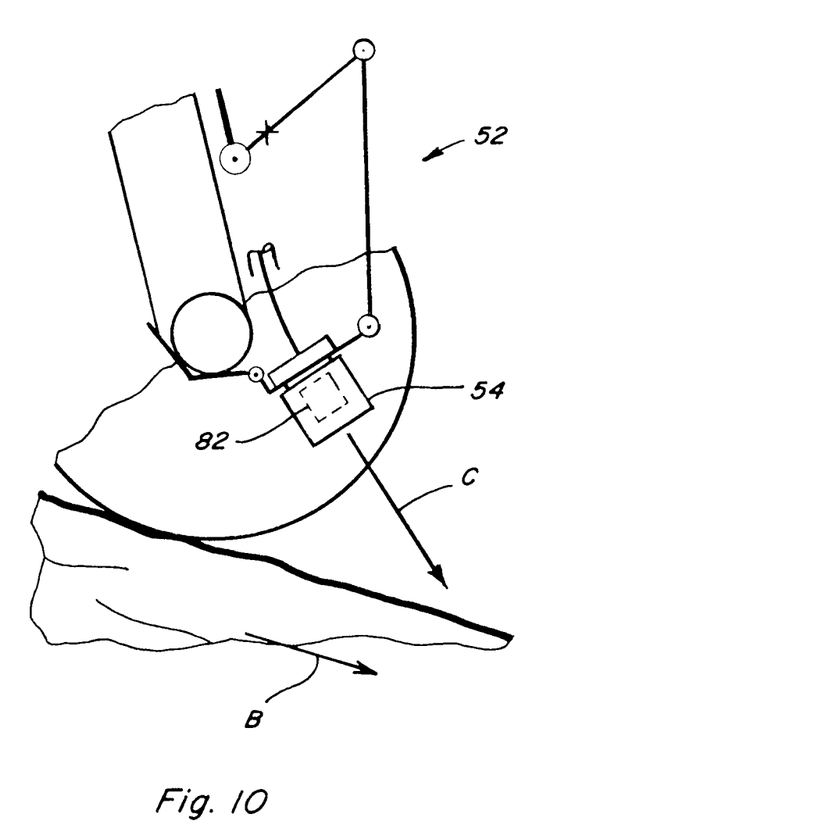
FIG. 10 is yet another simplified enlarged side view of the preferred feature of the application apparatus of the system.
Figure 11:
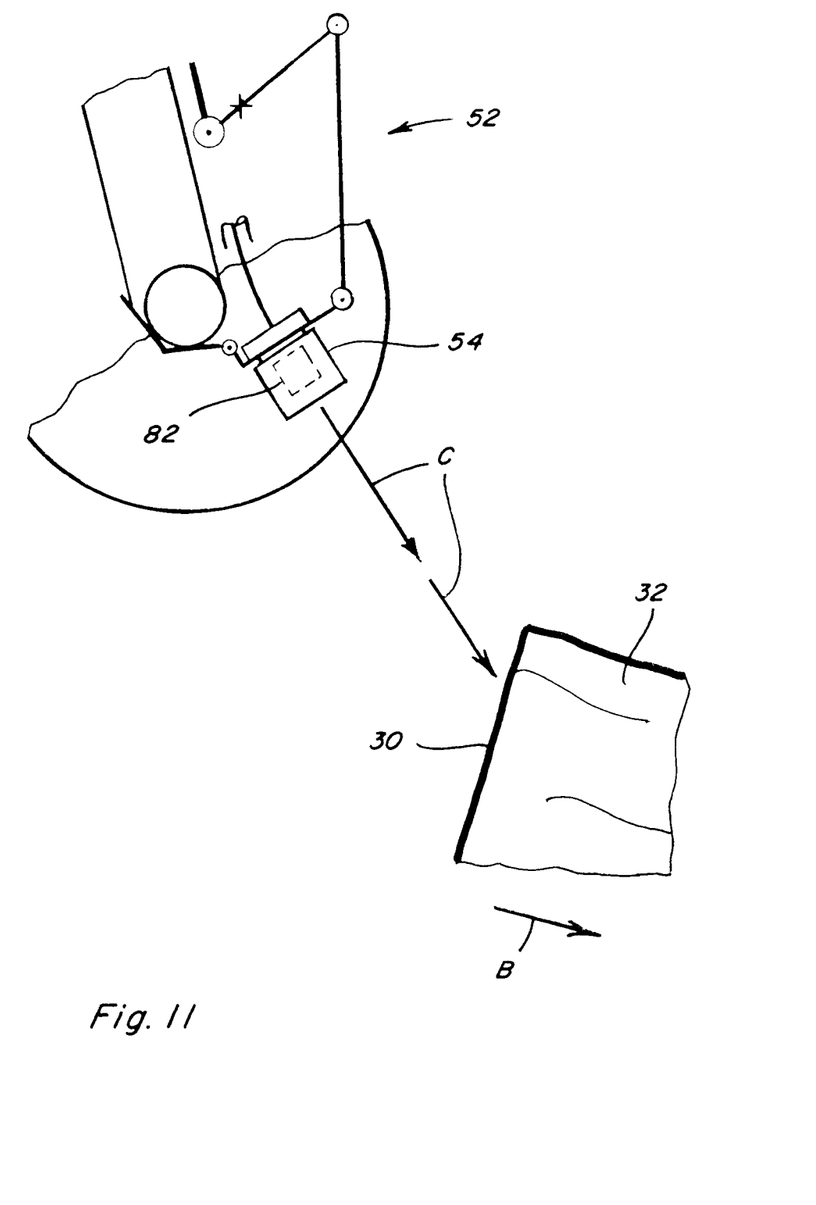
FIG. 11 is yet another simplified enlarged side view of the preferred feature of the application apparatus of the system.
Figure 12:
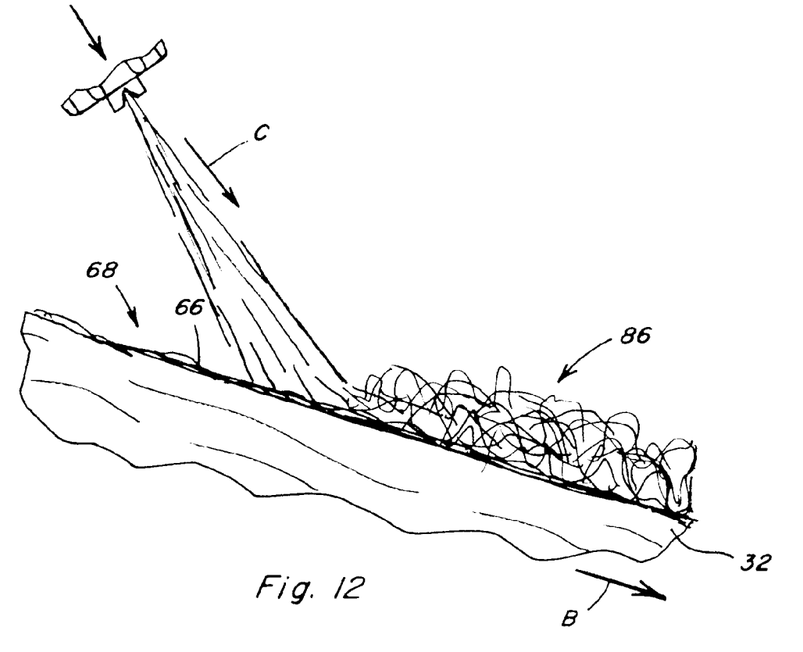
FIG. 12 is an enlarged partial side view of the cotton module during application of the protective layer.
Figure 13:
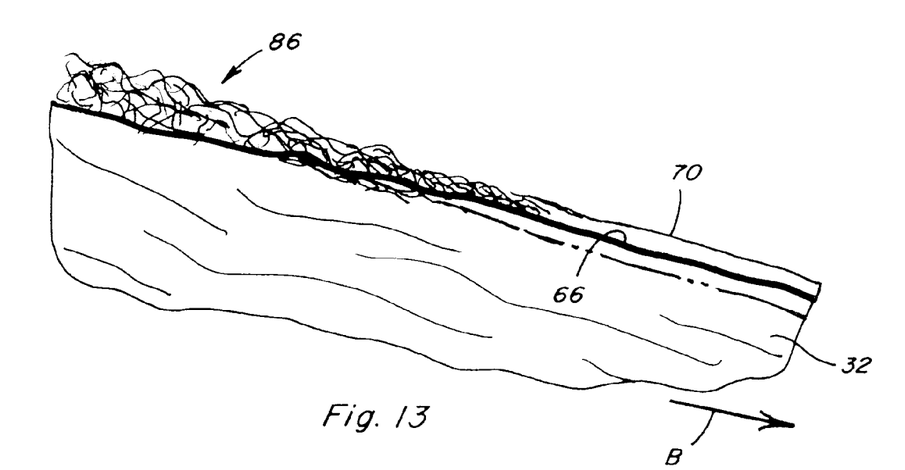
FIG. 13 is an enlarged partial side view of the cotton module as the protective layer begins hardening.
Figure 14:
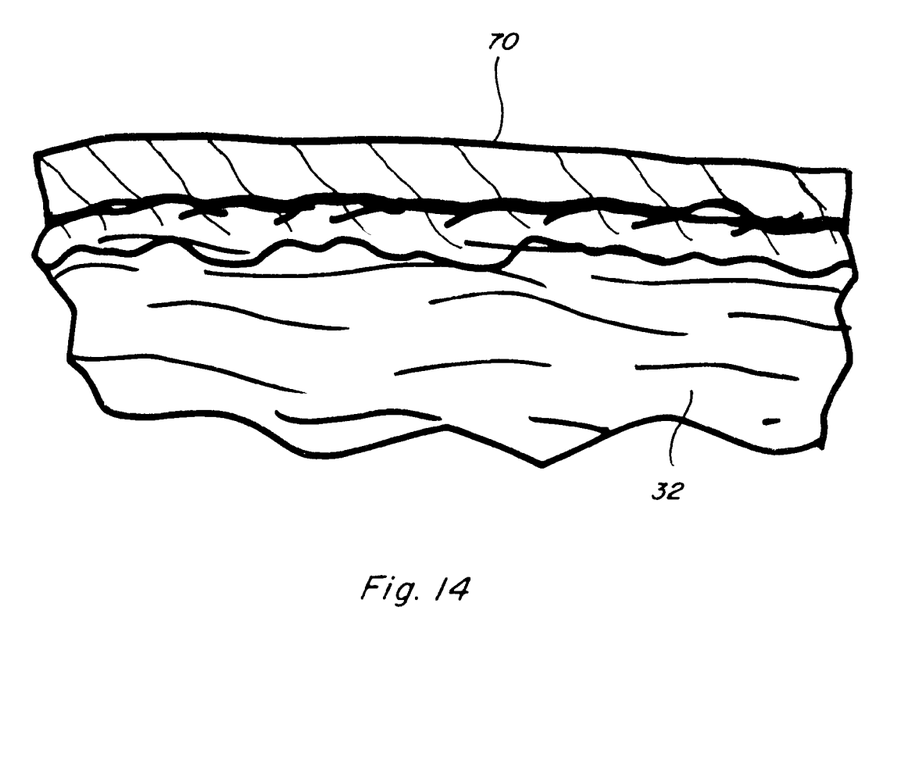
FIG. 14 is an enlarged partial side view of the cotton module after the protective layer has hardened.

Turning now to FIGS. 8-11 wherein another preferred aspect of the invention is shown. The at least one applicator 54 is pivotable from an initial position facing open end 36 of module builder 22 (FIG. 9) through a range of positions (FIG. 10) to a final position facing unloading direction B (FIG. 11). FIG. 8 shows a representative, non-limiting example of a rod and linkage arrangement 78 wherein extension and retraction of ram 80, denoted by arrow D, of a hydraulic cylinder, results in pivoting movement, denoted by arrow E, of the at least one applicator 54 through the range of positions. Application apparatus 52 is configured and operable to automatically begin applying fluid C with the at least one applicator 54 in the initial position (FIG. 9), pivot the at least one applicator 54 through the range of positions as cotton module 32 moves along unloading surface 38, and cease applying fluid C after the at least one applicator 54 reaches the final position (FIG. 11), such that the at least one applicator 54 is pivoted to apply fluid C to a leading end 46 of cotton module 32 as cotton module 32 exits module builder 22 (FIG. 9), to top surface 66 of module 32 as module 32 moves along unloading surface 38 (FIG. 10) and to trailing end 30 after module 32 passes the at least one applicator 54 (FIG. 11).

According to a preferred feature of the invention, the at least one applicator includes a check valve 82 as depicted by a ball and spring in phantom in FIG. 8, to prevent applying fluid C to unloading surface 38.

Figure 15:
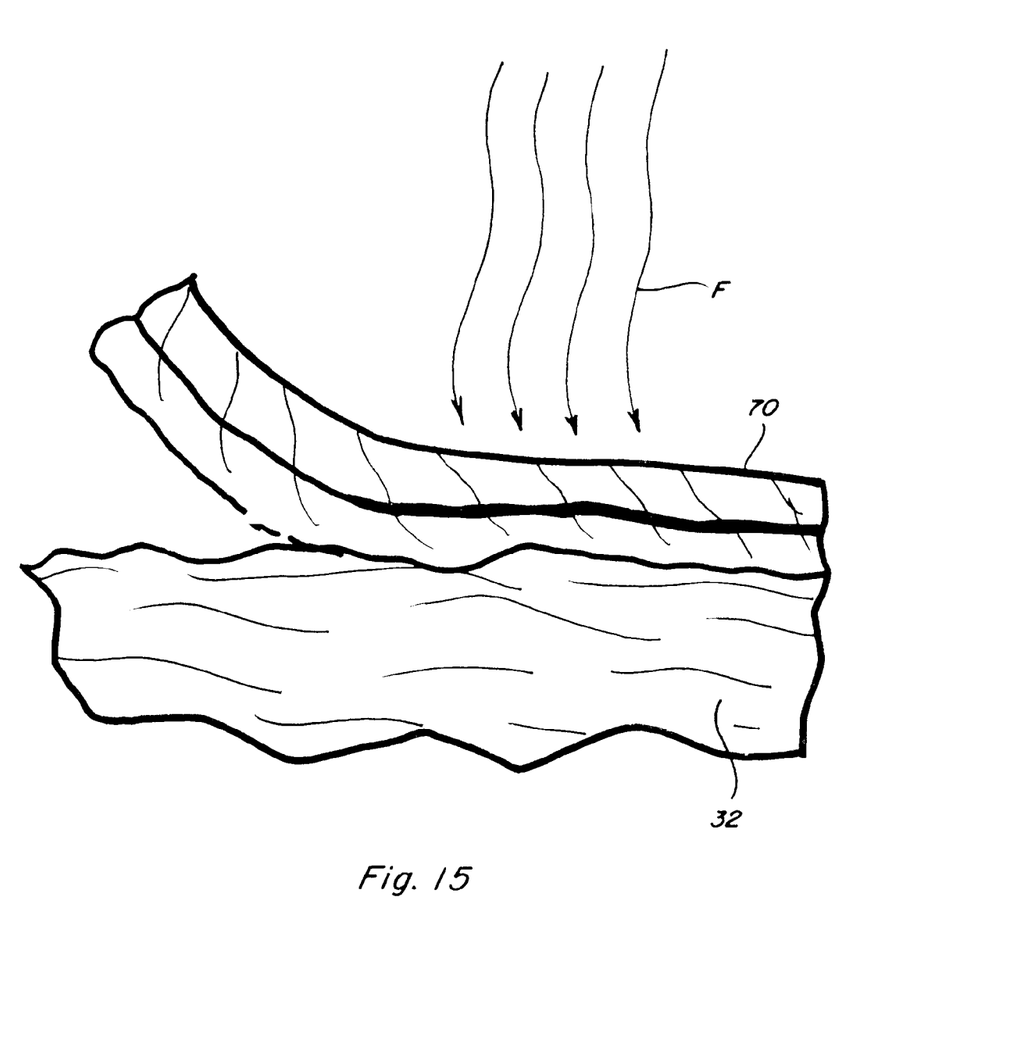
FIG. 15 is an enlarged partial side view of removal of the protective layer from the cotton module prior to processing.

Turning now to FIGS. 12-15, as mentioned above, fluid C is configured to be applied to an exterior 68 of cotton module 32 in a fluid state denoted by 86 and solidify into a water resistant layer 70 prior to significantly permeating exterior 68 of module 32, so as to capable of being removed therefrom prior to processing of module 32. FIG. 15 shows removal of water resistant protective layer 70 by applying heat, denoted by arrows F, prior to processing module 32. Fluid C may be applied by various application methods, including, but not limited to, spray, foam, drip, liquid curtain, brush, and the like.

According to another preferred aspect of the invention, fluid C comprises foam.

According to yet another preferred aspect of the invention, fluid C comprises a mixture of two or more chemicals contained in two or more tanks, respectively. FIG. 5 shows a chemical mixer 48 situated for mixing the chemicals just prior to application by the at least one applicator 54.

According to another preferred feature of the invention, fluid C solidifies in a manner to prevent significant expansion of the cotton module 32.

The system and method of the present invention provide the advantages of traditional module covers, such as protection from moisture, minimizing expansion, and the like, without many of the drawbacks, such as requiring a dedicated crew to apply the module covers or moisture problems due to ill fitting or worn covers, or covers lost to wind, and the like. In addition, the water resistant protective layer is applied immediately as the module is unloaded.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A system for protecting a cotton module of compacted cotton moving in an unloading direction from a cotton compacting chamber of a cotton module builder through an open end thereof along an unloading surface including at least one selectably operable unloading cotton driver in position for receiving and moving the cotton module, comprising: an application apparatus including at least one applicator in fluid communication with at least one tank, the at least one applicator configured and operable to apply a fluid contained in the at least one tank to at least a top surface of the cotton module as the cotton module moves through the open end of the cotton module builder along the unloading surface, the fluid configured to be applied to an exterior of the cotton module in a fluid state and solidify into a water resistant layer prior to significantly permeating the exterior of the module, so as to be capable of being removed therefrom prior to processing of the module, the at least one applicator being positioned rearward of the open end of the cotton module builder.

2. The system of claim 1, wherein the application apparatus is further configured and operable to apply the fluid to side surfaces adjacent to the top surface of the cotton module.

3. The system of claim 1, wherein the application apparatus is configured and operable to begin applying the fluid as the at least one unloading cotton driver initiates movement of the cotton module in the unloading direction.

4. The system of claim 1, wherein the module builder further includes a sensor for detecting passage of a trailing end of the cotton module by at least one predetermined location along the unloading surface, the application apparatus being configured and operable to begin applying the fluid as the at least one unloading cotton driver initiates movement of the cotton module in the unloading direction and cease application of the fluid as a function of passage of the trailing end of the cotton module beyond the at least one predetermined location.

5. The system of claim 1, wherein the module builder further includes an unloader control system configured and operable to selectably operate the at least one unloading cotton driver based on location of a trailing end of the cotton module along the unloading surface, the application apparatus being configured and operable to begin and cease application of the fluid dependent upon an operation of the at least one unloading driver by the unloader control system.

6. The system of claim 1, wherein the application apparatus is configured and operable to begin applying the fluid as the at least one unloading cotton driver initiates movement of the cotton module in the unloading direction and to cease applying the fluid after at least one unloading cotton driver ceases operation.

7. The system of claim 1, wherein the application apparatus is configured and operable to begin applying the fluid as the at least one unloading cotton driver initiates movement of the cotton module in the unloading direction, and to cease applying the fluid as a trailing end of the cotton module passes at least one predetermined location along the unloading surface.

8. The system of claim 1, wherein the at least one applicator comprises at least one nozzle configured and operable to apply the fluid in a fan shaped pattern.

9. The system of claim 1, wherein the at least one applicator is pivotable from an initial position facing the open end of the module builder through a range of positions to a final position facing the unloading direction and the application apparatus is configured and operable to automatically begin applying the fluid with the at least one applicator in the initial position, pivot the at least one applicator through the range of positions as the cotton module moves along the unloading surface, and cease applying fluid after the at least one applicator reaches the final position, such that the at least one applicator is pivoted to apply the fluid to a leading end of the cotton module as the cotton module exits the module builder, to the top surface of the module as the module moves along the unloading surface and to the trailing end after the module passes the at least one applicator.

10. The system of claim 1, wherein the at least one applicator includes a check valve.

11. The system of claim 1, wherein the at least one applicator includes at least one nozzle configured to apply the fluid, the fluid being a foam.

12. The system of claim 1, wherein the at least one applicator includes at least one nozzle configured to apply the fluid, the fluid solidifies in a manner to prevent significant expansion of the cotton module.

\* \* \* \* \*